United States Patent [19]

Palmer

[11] Patent Number: 4,681,770

[45] Date of Patent: Jul. 21, 1987

[54] FRUIT PRODUCTS CONTAINING FLAKED GRAINS

[75] Inventor: Kenneth L. Palmer, Plymouth, Minn.

[73] Assignee: General Mills, Inc., Minneapolis, Minn.

[21] Appl. No.: 748,381

[22] Filed: Jun. 25, 1985

[51] Int. Cl.$^4$ .............................................. A23L 1/072
[52] U.S. Cl. .................................... 426/615; 426/616; 426/658
[58] Field of Search ............... 426/615, 620, 621, 618, 426/619, 290, 625, 443, 455, 457, 458, 506, 509, 803, 102, 616, 658

[56] References Cited

U.S. PATENT DOCUMENTS

| | | |
|---|---|---|
| 2,272,990 | 2/1942 | Forkner et al. . |
| 2,355,031 | 8/1944 | Musher . |
| 2,650,880 | 9/1985 | Erickson . |
| 3,006,773 | 10/1961 | Fitzgerald . |
| 3,494,769 | 2/1970 | Tressler ............................... 426/620 |
| 3,506,447 | 4/1970 | Billerbeck ........................... 426/619 |
| 3,526,514 | 9/1970 | Gralak ................................. 426/619 |
| 3,705,814 | 12/1972 | Rahman et al. . |
| 4,117,176 | 9/1978 | Taylor et al. . |
| 4,256,772 | 3/1981 | Shanbhay et al. .................. 426/620 |
| 4,355,050 | 10/1982 | Butland . |
| 4,517,210 | 5/1985 | Fogel .................................. 426/621 |

FOREIGN PATENT DOCUMENTS

| | | | |
|---|---|---|---|
| 906829 | 8/1972 | Canada ............................... 426/621 |
| 1044945 | 12/1978 | Canada ............................... 426/621 |

OTHER PUBLICATIONS

Supplier Catalog "Oat Products" National Oats, Inc.

*Primary Examiner*—Raymond N. Jones
*Assistant Examiner*—Carolyn Paden
*Attorney, Agent, or Firm*—John A. O'Toole

[57] ABSTRACT

Disclosed are improved, intermediate moisture fruit compositions exhibiting the organoleptic properties of greater shortness and moistness and exhibiting reduced stickiness to teeth. The fruit compositions comprise: (A) about 4% to 30% by weight of fruit solids; (B) about 20% to 60% of carbohydrates; (C) about 2% to 25% flaked cereal grains; and (D) about 9% to 18% moisture. Also disclosed are methods for the preparation of such fruit products.

10 Claims, No Drawings

FRUIT PRODUCTS CONTAINING FLAKED GRAINS

BACKGROUND OF THE INVENTION

1. Technical Field of the Invention

The present invention relates to food products. More particularly, the present invention relates to sweetened fruit products containing flaked cereal grains and to their methods of preparation.

2. The Prior Art

Wholesome snacks prepared from sweetened, intermediate moisture, shelf stable fruit have recently become popular food items. These compositions per se are sold in various physical forms and shapes. (See, for example, U.S. Pat. No. 2,272,990, issued Oct. 18, 1941 to Forkner et al. and U.S. Pat. No. 2,650,880, issued Oct. 1, 1941 to A. M. Ericson). While popular, such fruit snacks nonetheless exhibit certain undesirable properties. For example, certain consumers prefer fruit snacks which are not as chewy. Also, the known fruit compositions undesirably stick to consumer's teeth. Further, present compositions frequently exhibit shiny surfaces which are perceived by some consumers as undesirably appearing as "processed." Moreover, even though these products are intermediate in moisture so as to be shelf stable, the known products are deficient in perceived moistness.

Previous art attempts at providing fruit products of reduced stickiness include U.S. Pat. No. 2,355,031 (issued Aug. 1, 1944 to S. Musher) which teaches the addition of a special dry milled oat fraction as an antistickiness agent. The '031 patent indicates that the finely divided oat fraction is not replacable in view of its unique properties by other fractions of oats or by other cereals or their fractions. It is also known to add to certain fruit products bran from wheat or rice to reduce gumminess or stickiness as well as providing vitamin fortification. (See, for example, U.S. Pat. No. 3,006,773, issued Oct. 31, 1961 to G. F. Fitzgerald and U.S. Pat. No. 4,421,771. issued Dec. 20, 1983 to K. W. Stock et al.). However, notwithstanding the teachings of the prior art with regard to the usefulness of bran in reducing stickiness, the deficiencies of present sweetened fruit snacks do not appear to be remedial by the addition of bran.

In view of the prior art, there is a continuing need for new and useful sweetened fruit compositions which are not subject to the deficiencies noted in known compositions. Accordingly, it is an object of the present invention to provide sweetened fruit products having improved organoleptic properties.

In particular, it is an object of the present invention to provide sweetened fruit compositions exhibiting desirably shorter textures.

It is another object of the present invention to provide sweetened fruit compositions which are of reduced stickiness to teeth.

Another object is to provide sweetened fruit compositions of intermediate moisture and which are shelf stable but have an enhanced perception of moistness.

Still another object of the present invention is to provide fruit products which are aesthetically appealing as less processed.

An important object of the present invention to obtain the above objects without the addition to the sweetened fruit formulation of ingredients which are not perceived by consumers as being "natural," i.e., containing only "natural ingredients". The term "natural" ingredients is used herein to refer to those ingredients which are not chemically modified nor chemically synthesized.

It has been surprisingly discovered that the above objectives can be realized and superior sweetened fruit provided by formulating compositions, comprising flaked cereal grains, fruit solids, carbohydrates and moisture.

Each of the patents cited herein are incorporated by reference.

SUMMARY OF THE INVENTION

The present invention provides improved, intermediate moisture sweetened fruit compositions and products. The improved fruit compositions exhibit superior organoleptic and visual properties. The fruit products exhibit greater shortness and perceived moistness. Also, the compositions are not as sticky to the teeth.

The fruit compositions essentially comprise:
A. about 4% to 30% of fruit solids,
B. about 20% to 60% nutritive carbohydrate sweetening agent,
C. about 2% to 25% rolled cereal grains, and have a moisture content of about 9% to 18%,
D. about 3% to 16% of a bulking agent.

DETAILED DESCRIPTION OF THE INVENTION

The present invention provides improved, sweetened fruit compositions comprising fruit solids, carbohydrates and flaked rolled cereals and moisture. Each of these components as well as product properties, preparation and use are described in detail below.

Throughout the specification and claims, all percentages are based upon the weight of the product and temperatures are in degrees Fahrenheit, unless otherwise indicated.

A. Fruit Solids

A principal component of the present invention is fruit solids. The fruit solids can be derived from fruit purees prepared from whole fruit flesh or if such purees have been partially dehydrated, fruit paste. The term "puree" has been used in the art to refer to both heat treated, e.g., boiled and untreated food pulp. As used herein, however, "puree" is meant to refer both to heat and unheat-treated whole fruit pieces which have been mechanically transformed into fluids. Both seeded and unseeded purees can be used. Fruit puree generally contains about 55% to 90% moisture. The fruit solids component can also be supplied by other edible fruit portions, such as fruit pulp. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include pineapple, lemon, orange, peach, pear, grape, mango, apple, tomato, blackberry, plum, blueberry, raspberry, strawberry, current, cherry, and mixtures thereof. Preferred fruits are selected from the group consisting of strawberries, cherries, blueberries, raspberries, grapes, oranges and mixtures thereof. Most highly preferred for use herein are grapes, strawberries, oranges and cherries.

Fresh fruit is, of course, highly preferred for preparing the products herein. However, previously frozen fruit, canned fruit, partially dehydrated fruit or rehydrated fruit, as well as frozen juices, concentrates, nectars, or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden variety vegetables. The sugars, flavors, acids, pectinaceous or cellulosic fibers and ash of which plant solids are typically comprised are intended to be included within the term edible plant solids. However, "edible plant solids" is not intended to include such starch fractions as wheat or other cereal flours nor oleaginous materials such a soybean oil. That is, the present fruit solids can be wholly or partially replaced with equivalent amounts of ordinary garden vegetable solids. However, vegetable flavored products are not nearly as popular as those which are fruit flavored. However, certain vegetables, e.g., pumpkin, squash and carrot enjoy some popularity as novelty items.

The present compositions essentially comprise from about 4% to 30% (dry weight basis) of the composition of comminuted fruit or plant solids. Better results in terms of natural flavor and color but at economical costs are obtained when the fruit solids are present at from about 10% to 25%. Best results are obtained when the fruit solids are present at about 18%.

B. Sweetening Agent

A nutritive carbohydrate sweetening agent (or, equivalently "sweeteners") is an essential component herein and is present in the present food compositions at from about 0.1 to 60%. Better results in terms of flavor and low stickiness are obtained when the sweeteners comprise about 20% to 45% of the composition. For best results, the carbohydrate content should range from about 35% to 40%.

The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharine, cyclamate, and the like. Additionally, the present carbohydrate sweetening agents are to be distinguished from such protein-based sweetening agents as aspartame, thaumatin, and monellin.

Suitable materials for use as nutritive carbohydrate sweetening agents are well known in the art. Examples of sweetening agents include both mono-saccharide and di-saccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, and fructose. Of course, mixtures of the above-noted materials are contemplated herein.

C. Rolled Cereal Grains

Rolled cereal grains are another essential component of the present invention. It is important that the rolled cereal grains comprise from about 2% to 25% by weight. Better results in terms of the improved properties provided herein are obtained when the rolled cereal grains comprise from about 5% to 10% by weight of the finished product composition. Best results are obtained when the rolled cereal grains are present in the instant food products at about 7%. Adequate amounts of the flaked cereal grains is important to realization of the improved attributes of the present food products. Excessive flaked cereal grain addition is to be avoided due to the development of undesirable gummy characteristics.

The flaked cereal grain is responsible for the realization of finished sweetened fruit products with eating characteristics of having a shorter texture, being less chewy, having a perceived moister mouthfeel, and dissolving quicker in the mouth. The present invention also improves the physical nature of the finished product by reducing static deformation, i.e., by creating a "soft rigidity." The present invention also improves appearance by realizing a product characterized by an external surface having an appearance which is uniformly rough textured, natural looking, and of reduced shininess. The shininess of certain commercial products is perceived by some consumers as suggesting excessive processing.

While not wishing to be bound by the proposed theory, it is speculated herein that the flaked grains absorb and strongly bind water (and possibly oil) which increases the overall moisture content creating a softer yet non-deformable product with moist eating qualities. Because the moisture is tightly bound, stickiness does not increase and may be reduced (depending upon the moisture content desired). The shortness and texture is attributable to the physical dimensions and fibrous nature of the flaked grains which create a discontinuous phase preventing formation of very cohesive structures that resist shearing. The shortness contributes to a less chewy, more dissolvable finished product.

The flaked cereal grains can be supplied from oats, barley, rye, wheat, triticale, or combinations thereof. Preferred for use herein are oats due to their neutral flavor and stability. Throughout the specification, while specific reference is made to oats, the skilled artisan will appreciate that other flaked cereal grain can be equivalently employed.

Flaked oats come in a variety of different shapes and sizes, each of which are usefully added to the present fruit compositions. The thickest oat flake sold in today's industrial and consumer marketplace is the rolled oat. Rolled or "Old Fashioned" oats are simply whole oat berries or grouts that have been passed through rollers to flatten the grout. Quick oats are made by steel cutting the berry into several pieces, and then rolling the segments quite thin. Baby oat flakes are a smaller version of quick oats and are less visible than the larger flakes and finished foods. Instant oats can also be used herein. Grouts intended for instant oats are subjected to extra steaming. Highly polished rollers with a very narrow gap compresses the grouts into flakes. Next, screening removes germ flakes and sifting removes flour fines and odd shaped flakes.

However, it has been surprisingly found that below a minimum particle size, the advantages of the present invention are not realized. Thus, for example, oat flour has not been successfully added to the present sweetened fruit products to realize the advantages of the present invention. Thus, it is important that the initial average particle size of the flaked cereal grains be greater than such that about 75% are retained on U.S. 10 Standard size sieve and with a flake minimum thickness of about 10 mil. It is to be appreciated that some further size reduction can occur due to further processing of the present admixed ingredient without loss of the advantages of the present invention.

D. Additional Ingredients

The present food compositions can optionally contain a variety of additional ingredients suitable for rendering such products more organoleptically acceptable, more nutritious and/or more storage stable. While not essential to the present food compositions, such optional components include bulking agents, fiber materials, high potency sweeteners, colors, coloring agents, vitamins, preservatives, emulsifiers, shortening, dairy products, acidulants, and the like. Of course, highly preferred for use herein are "natural" ingredient additives.

In one highly preferred embodiment, the compositions additionally include a bodying agent. The bodying agent can serve to add both bulk and body and, most importantly, provide additional solids so as to enable the realization of fruit compositions having moisture contents within the essential ranges given herein. Especially useful herein as bodying agents are malto dextrins. Generally, the maltodextrin component is present at from about 0.1% by weight to about 20% by weight. Superior results in terms of sweetness balancing and prevention of crystallization are obtained when the malto dextrin component is present in the compositions at from about 3% to 16% by weight. For best results, however, the malto dextrin component should be employed at from about 10% to 16%.

It is important in the provision of organoleptically acceptable sweetness that the malto dextrin be bland and provide minimal sweetness. Thus, low D.E. (dextrose equivalent) malto dextrin should be employed. By low D.E. is meant a malto dextrin with a D.E. of less than about 20. Low D.E. malto dextrins are commercially available and the skilled artisan will have no difficulty in selecting suitable malto dextrins for use herein. Generally, however, malto dextrins can be obtained by dextrinization of starch, particularly corn starch. Enzymatic hydrolyzates, optionally under acidic conditions, of the starch can be used; the conditions are so mild that negligible repolymerization occurs. This is in contrast to dextrins which typically are made from starch by hydrolyzates and repolymerization by using high temperature and pressure by dry heating or roasting of the starches (pyro dextrins). Such materials are well known (see, for example, U.S. Pat. No. 3,586,513, issued June 22, 1972 to H. E. Horn et al. and U.S. Pat. No. 4,335,155, issued June 15, 1982 to Blake et al.), and are widely available in the food industry.

Another class of materials useful herein as bodying or bulking agents are hydrogenated starch hydrolyzates which are commonly referred to as "polydextrose." Polydextrose provides an added advantage of being a low calorie material, i.e., having about one calorie per gram as opposed to about four calories per gram for most carbohydrates.

Certain preferred embodiments additionally can comprise a shortening component. The shortening component additionally affects the eating qualities of the present compositions. Inclusion of a shortening increases the shortness of the texture as well as reduces modestly the stickiness of the composition to the consumer's teeth. If present, the shortening can comprise about 0.1% to 8%, preferably 3% to 7% of the composition. Useful herein are shortenings and oils which are conventional for use in food products, especially for confections. Both conventional fatty triglyceridic materials as oils and fats can be used herein. Preferred for use herein are fats, especially partially hydrogenated oils such as soybean, coconut, cottonseed or fractionated oils, all of which have melting points above room temperature. Employment of such particular fats are preferred due to a reduced tendency of the glyceridic component to grease out of the present fruit compositions.

METHOD OF PREPARATION

The present compositions are prepared by forming a wet blend, including hydrated cereal grains, drying and forming into pieces of desired shapes and sizes.

Typically, a wet blend is prepared comprising about 40% to 70% solids. The grains can be hydrated by subjecting the wet blend with the flaked cereal grains to a soaking step. However, it is possible to add already hydrated cereal grains to the wet blend so as to avoid the soaking step to avoid thereby unnecessary and undesirable degradation of either the flavor or color constituents of the fruit. The flaked grains can be hydrated by cooking in conventional manner in water or other fluids such as milk or fruit juices.

The wet blend can then be dehydrated to desired moisture levels. Typically, the finished moisture level ranges from about 9% to 18%. Conventional dehydration techniques can be used to practice the present drying step. Such techniques include, for example, forced hot air convection, microwave heating, thin film conduction heating or combinations thereof. Preferred for use herein is thin film conduction heating.

In one preferred method of preparation, the materials are simply blended and shaped into desired shapes and sizes without drying. Such a method is preferred due to avoidance of the cost of drying, better control of moisture content and minimization of the flavor degradation that can accompany drying. Such a technique merely requires selection of particular amounts of materials with particular attention to their moisture content such that formulations with desired finish moisture contents are realized.

The present compositions can be fabricated in suitably shaped and sized pieces either before or after dehydration, as convenient. Typical shapes include thin films, bars, and bite-sized nuggets.

The food products so formed are characterized by being nutritious, wholesome snacks. Preferred formulations are prepared from all natural ingredients. The products are less chewy and exhibit reduced stickiness to the teeth.

The present invention is illustrated by the following examples:

EXAMPLE 1

A fruit product of the present invention is prepared from the following formulation.

| Ingredient | Weight % |
| --- | --- |
| Strawberries | 36.00 |

-continued

| Ingredient | Weight % |
| --- | --- |
| Orange pulp | 14.00 |
| Sucrose | 15.00 |
| Maltodextrin (10 D.E.)[1] | 14.00 |
| Rolled Oats | 12.00 |
| Hydrogenated Soybean Oil (90° F.)[2] | 2.00 |
| Natural flavoring concentrate | 4.00 |
| Citric Acid | 2.00 |
| Lecithin | 1.00 |
| | 100.00% |

[1] A 10 D.E. maltodextrin available from American Maize Products Co. under the trade name of Frodex 10 TM.
[2] A partially hydrogenated soybean oil available from SCM Corp. having a melting point of 90° F.

Two thousand grams of the above ingredients are blended together to form a wet blend. The strawberries are first comminuted to a puree and mixed with the orange pulp. Thereafter, the dry ingredients are mixed into the fruit blend. The soybean oil is melted and then mixed into the blend. Finally, the flavorings are added.

The blend is allowed to stand for about two hours at room temperature to allow the rolled oats to hydrate. The wet mixture has a moisture content of about 50%.

Thereafter, the wet blend is spread out onto sheets of wax paper in 1 oz. (28 g) portions to form a thin film and tray dried to a moisture content of about 16%.

The intermediate moisture, sweetened fruit products of the present invention in the form of fruit leathers exhibit a desirably moist character, have a rough appearance and texture, and are less chewy. The products are wholesome.

EXAMPLE 2

A fruit product of the present invention is prepared from the following formulation:

| Ingredient | Weight % |
| --- | --- |
| Cherries | 16.00 |
| Pineapple juice concentrate (61° Brix) | 10.00 |
| Pear concentrate (32° Brix) | 10.00 |
| Sucrose | 10.00 |
| Maltodextrin (10 D.E.) | 15.00 |
| Dried corn syrup (25 D.E.) | 15.00 |
| Quick oats | 3.00 |
| Wheat flour | 4.00 |
| Fractionated palm oil | 3.00 |
| Natural flavoring concentrate | 3.00 |
| Citric acid | 1.30 |
| Lecithin | 0.20 |
| Water | 9.50 |
| | 100.00% |

Four pounds of the above ingredients are blended together to form a wet blend and dehydrated in a manner similar to that of Example 1.

The intermediate moisture, sweetened fruit products of the present invention also in the form of fruit leathers, similarly exhibit a desirable moist character, and are less chewy. These products are wholesome and contain only "all-natural" ingredients.

EXAMPLE 3

A fruit product of the present invention is prepared from the following formulation:

| Ingredient | Weight % |
| --- | --- |
| Orange pulp | 20.00 |
| Grape concentrate (45° Brix) | 20.00 |
| Peach concentrate (32° Brix) | 12.00 |
| Sucrose | 20.00 |
| Corn syrup (63 D.E.) | 10.00 |
| Baby oat flakes | 7.00 |
| Wheat flour | 2.00 |
| Hydrogenated coconut oil (92° F.) | 5.00 |
| Natural flavoring concentrate | 2.00 |
| Malic acid | 1.50 |
| Lecithin | 0.50 |
| | 100.00% |

A 20 lb. (9.1 kg.) batch of the above ingredients were blended together to form a wet blend in a manner similar to that of Examples 1 and 2. However, the wet blend was thin film conduction heat dried to a moisture content of 15%. While still warm, the heated mass was formed into 1 oz. (28 g) bars and packaged in conventional packaging.

The intermediate moisture, sweetened fruit products of the present invention in the form of fruit bars also exhibit a moist character, of a less shiny appearance compared to commercially available products, are less chewy than commercial products and stick less to the teeth. The products of the present invention are wholesome.

Compositions of substantially similar characteristics are realized when in the above formulation the baby oat flakes are replaced with equivalent levels of flakes prepared from barley, rye, wheat and triticale.

EXAMPLE 4

A fruit product of the present invention is prepared from the following formulation:

| Ingredient | Weight % |
| --- | --- |
| Dried apple powder | 17.00 |
| Apple puree (38° Brix) | 16.00 |
| Sucrose (microse grind) | 15.30 |
| Maltodextrin[1] | 15.00 |
| Corn syrup solids (25 D.E.) | 12.00 |
| Shortening[2] | 6.00 |
| Baby oats | 5.00 |
| Glycerine | 3.00 |
| CMC[3] | 3.00 |
| Natural apple flavor | 3.00 |
| Pregel starch[4] | 2.00 |
| Water | 2.00 |
| Citric acid | 0.70 |
| | 100.00% |

[1] Frodex 10 TM
[2] A partially hydrogenated soybean oil available from SCM Corp.
[3] Sodium carboxymethyl cellulose type 7H3SXF available from Hercules Powder Co.
[4] Instant Clearjel TM available from National Starch & Chemical Corp.

A 15 lb. (6.82 kg.) batch of fruit product is prepared by first preparing a pre-blend of dry ingredients and the wet ingredients. The wet ingredients are heated to about 100° F. or until the shortening is melted and dispersed therein. The wet ingredients are slowly added to the dry ingredients with strong mixing equipment. The mixture is slabbed to a sheet of 0.5 in. (1 cm.) thickness, allowed to cool, and cut into pieces.

The intermediate moisture sweetened fruit products of the present invention so prepared exhibit a desirable short texture and superior flavor due to avoidance of a dehydration step.

What is claimed is:

1. In a food composition comprising:
   A. about 4% to 30% by weight of the composition of edible plant solids, said solids selected from the group consisting of fruits, garden variety vegetables and mixtures thereof;
   B. about 20% to 60% by weight of the composition of sweeteners;
   C. about 9% to 18% by weight of the composition of moisture;
   D. about 3% to 16% by weight of the composition of a bulking agent;

and wherein the composition is in the form of a homogeneous mass, the improvement whereby a shortened and more moist texture is provided by adding:
   E. about 2% to 25% by weight of the composition of rolled cereal grains, said cereal grains having an average particle size greater than about 10 mil in thickness.

2. The food composition of claim 1 wherein the edible plant solids are fruit solids
   A. wherein the fruit solids comprise from about 9% to 30% by weight of the composition;
   B. wherein the sweeteners comprise about 20% to 60% by weight of the composition;
   C. wherein the rolled cereal grains comprise from about 2% to 25% by weight of the composition.

3. The food composition of claim 1 additionally comprising
   F. about 0.1% to 8% of a shortening component.

4. The food composition of claim 3 wherein the flaked cereal grains are selected from the group consisting of oats, barley, rye, wheat, triticale and mixtures thereof.

5. The food composition of claim 4 wherein the edible plant solids is derived from fruits.

6. The food composition of claim 5 wherein the edible plant solids are selected from the group consisting of strawberries, cherries, blueberries, raspberries, grapes, oranges and mixtures thereof and wherein the sweeteners are selected from the group consisting of sucrose, corn syrup solids and fructose, and wherein the rolled cereal grain is oats.

7. The food composition of claim 6 wherein the flaked cereal grain has a particle size distribution such that at least 75% is retained on a U.S. Standard size No. 10 screen.

8. The food composition of claim 7, comprising:
   G. about 3% to 16% by weight of the composition of a bodying agent.

9. The food composition of claim 8, comprising:
   A. about 18% by weight of the composition of fruit solids,
   B. about 35% to 40% by weight of the composition of sweeteners;
   C. about 7% by weight of the composition of flaked cereal grains;
   D. about 3% to 7% by weight of the composition of a shortening ingredient; and
   E. about 10% to 16% by weight of the composition of a bodying agent.

10. The food composition of claim 9 wherein the bodying agent is a malto dextrin.

* * * * *